US012546371B2

(12) United States Patent
Sin Xicola et al.

(10) Patent No.: US 12,546,371 B2
(45) Date of Patent: Feb. 10, 2026

(54) FRICTION MATERIAL BLOCK, IN PARTICULAR FOR EQUIPPING BRAKE PADS AND ASSOCIATED BRAKE PAD AND METHOD

(71) Applicant: ITT Italia S.R.L., Milan (IT)

(72) Inventors: Agustin Sin Xicola, Frossasco (IT); Andrea Isoardi, Busca (IT); Laura Rinaldi, Shanghai (CN); Daniele Genta, Bibiana (IT); Flavio Trombotto, Pinerolo (IT)

(73) Assignee: ITT Italia S.R.L., Milan (IT)

( * ) Notice: Subject to any disclaimer, the term of this patent is extended or adjusted under 35 U.S.C. 154(b) by 418 days.

(21) Appl. No.: 18/026,777

(22) PCT Filed: Sep. 17, 2021

(86) PCT No.: PCT/IB2021/058480
§ 371 (c)(1),
(2) Date: Mar. 16, 2023

(87) PCT Pub. No.: WO2022/058942
PCT Pub. Date: Mar. 24, 2022

(65) Prior Publication Data
US 2023/0349434 A1 Nov. 2, 2023

(30) Foreign Application Priority Data
Sep. 17, 2020 (IT) .................. 102020000021919

(51) Int. Cl.
*F16D 65/04* (2006.01)
*F16D 69/02* (2006.01)

(52) U.S. Cl.
CPC ........... *F16D 65/04* (2013.01); *F16D 69/026* (2013.01); *F16D 2200/006* (2013.01); *F16D 2250/0007* (2013.01); *F16D 2250/0084* (2013.01)

(58) Field of Classification Search
CPC .. F16D 65/04; F16D 69/026; F16D 2200/006; F16D 2250/0007; F16D 2250/0084
See application file for complete search history.

(56) References Cited

U.S. PATENT DOCUMENTS

| 4,002,592 A * | 1/1977 | Baskin | ..... C08K 7/00 524/413 |
| 2004/0012061 A1* | 1/2004 | Reid | ..... C09D 4/00 257/415 |

(Continued)

FOREIGN PATENT DOCUMENTS

| JP | H06184524 A | 7/1994 |
| JP | 2006125618 A | 5/2006 |

(Continued)

OTHER PUBLICATIONS

European Patent No. EP 3507587 to Six Xicola et al published on Jun. 17, 2020.*

(Continued)

*Primary Examiner* — Pamela Rodriguez
(74) *Attorney, Agent, or Firm* — Turk IP Law, LLC

(57) ABSTRACT

Friction block or layer made of an asbestos free friction material, the friction material including, as composing materials thereof, inorganic and/or organic and/or metallic fibers, at least a binder, at least a friction modifier or lubricant and at least a filler or abrasive, wherein the asbestos free friction material also contains, as an additional composing material or additive, an hydrophobic wax, preferably present from 0.5% to 5% in volume, the asbestos free friction material block or layer possessing a hydrophobicity, defined as the (Continued)

time of absorption within the friction material of a liquid drop formed by 20+/−5 μL of distilled water, of more than 60 minutes, so that the force to detach the friction block or layer from a metallic surface to which it has been made to stitch electrochemically is lower than 15 Nw.

13 Claims, 13 Drawing Sheets

(56) References Cited

U.S. PATENT DOCUMENTS

| | | | |
|---|---|---|---|
| 2022/0010857 A1* | 1/2022 | Watanabe | F16D 69/026 |
| 2022/0163081 A1* | 5/2022 | Takada | F16D 69/026 |

FOREIGN PATENT DOCUMENTS

| | | | |
|---|---|---|---|
| JP | 2016065163 A | | 4/2016 |
| KR | 1020090125175 A | | 12/2009 |
| WO | 2019171325 A1 | | 9/2019 |

OTHER PUBLICATIONS

Translation of Japanese Patent No. JP 2006-125618 obtained from website: https://worldwide.espacenet.com on Jul. 15, 2025.*
JPO, Search Report, May 21, 2024.
CNIPA, Office Action and Search Report, 11 pages, Apr. 30, 2025.
International Search Report and Written Opinion for International App No. PCT/IB2021/058480, pp. 23.

* cited by examiner

FRICTION MATERIAL BLOCK, IN PARTICULAR FOR EQUIPPING BRAKE PADS AND ASSOCIATED BRAKE PAD AND METHOD

CROSS-REFERENCE TO RELATED APPLICATIONS

The present application is a U.S. National Stage filing under 35 U.S.C. § 371 of International Application PCT/IB2021/058480, filed Sep. 17, 2021, which claims priority from Italian patent application no. 102020000021919 filed on 17 Sep. 2020, the entire disclosures of which are incorporated herein by reference.

TECHNICAL FIELD

This disclosure is generally relating to a friction block made of a friction material, the block being designed for equipping brake pads, in which the friction material can have a formulation that allows to decrease or eliminate the tendency of the friction block to stitch against a surface of a friction partner cooperating therewith, a phenomenon known as "stiction". The disclosure generally relates to a friction block of a brake pad and to the associated brake pad designed to cooperate with the surface of a vehicle disc brake to brake a vehicle. The disclosure also generally relates to an associated method.

PRIOR ART

It is known that, particularly under harsh operating and/or environmental conditions, for example, frequent off-road driving and/or driving on muddy tracks or routes exposed to brackish air or acid rain, this may result, in use, in the "gluing" of one or more of the brake pads of a vehicle to the relative brake disc made of cast iron or steel. This is generally due to corrosive phenomena that affect the brake disc and that, during braking, result in the corrosion products combining with the friction material of the brake pad causing accidental adhesion of the brake pad to the brake disc, adhesion that is temporarily maintained even when the vehicle brake is deactivated. This phenomenon of adhesion is known by the English technical term "stiction", a term that derives from the contraction and merging of the terms "static" and "friction", i.e. the term "static friction".

Obviously, the occurrence of a stiction or gluing phenomenon on a vehicle in use involves various drawbacks, such as jolts/straining during braking and subsequently the releasing of the brake, increased energy consumption and, in extreme cases, breakage of the friction material of the brake pad, which leads to vehicle breakdown and/or the necessity for the premature replacement of the brake pads. So, stiction phenomenon is well known in the brake pads field and also affect vehicles always running on paved roads, when exposed to damp whether condition.

SUMMARY

The purpose of this disclosure is to provide embodiments of a friction block or layer made of a friction material, in which the friction material has a formulation that allow to decrease or eliminate the tendency of the friction block to stitch against a surface of a friction partner cooperating therewith.

In particular, the purpose of this disclosure is to provide embodiments of such friction block as an integral part of, or integrated in, a brake pad designed to cooperate in use with a brake disc made of steel or cast iron.

The disclosure therefore relates to embodiments of a friction block or layer made of a friction material formulated in such a way to decrease or eliminate the tendency of the friction block to stitch against a surface of a friction partner thereof, as defined in the attached claims.

Generally speaking, the friction block or layer may be either an integral part of a brake pad for vehicles and designed to cooperate in use with a brake disc made of steel or cast iron, or an integral part of a clutch disc for vehicles or for any other application.

The disclosure further relates to embodiments of a brake pad equipped with, or having as an integrated component thereof, such friction block or layer.

The disclosure also relates to embodiments of a method for manufacturing brake pads for vehicles having a reduced or nil tendency to stitch against the friction surface of an associated brake disc, i.e. a reduced or nil tendency to stiction, especially under damp weather.

EP3507587, hereby incorporated by reference in its entirety, discloses a method for studying and determining the physico-chemical conditions of adhesion between a first and a second mechanical element consisting, respectively, in a vehicle braking element and an element to be braked, comprising the steps of:

coupling the first mechanical element to a first support and the second mechanical element to a second support, the first and second support being positioned opposite one another and being relatively axially movable, the second support towards the first support, in such a way that the second mechanical element is completely embedded within the second support, except for a first face thereof that is not covered by the second support and that is arranged flush with a front end of the second support facing towards the first support and the first mechanical element coupled therewith;

electrically connecting the second mechanical element to an insulated electric wire that protrudes in a fluid tight manner from the second support;

making to adhere and then pressing by means of a first predetermined force, the first face of the second mechanical element against the first mechanical element pushing the second support towards the first, such as to realize a stiction cell comprising the first and the second mechanical elements and the first and second support;

immersing said first and second mechanical elements together with said first and second supports in an electrolyte together with at least one counter-electrode and a reference electrode in such a way as to form an electrochemical cell of which the second mechanical element constitutes a working electrode;

electrically connecting the insulated electric wire, the counter-electrode and the reference electrode to a potential and/or current generator;

carrying out by the potential and/or current generator electrochemical tests, wherein progressively variable potentials are applied between the working electrode and the reference electrode and/or a progressively variable electric current passage is established between the counter-electrode and the working electrode, by the action of which a corrosive phenomenon is made to happen between the second mechanical element and the first mechanical element;

detecting by means of the potential/current generator or with another instrument the electric current that is passed through the electrolyte between the second mechanical element and the counter-electrode as a function of the potential applied or, conversely, detecting the potential that is established between the second mechanical element and the reference electrode as a function of the predetermined current which is set on the potential/current generator.

In this manner a "stiction" between a vehicle braking element (a brake pad) and an element to be braked (a brake disc) under investigation is quickly obtained in an "artificial" manner under controlled conditions. Then, a force necessary to detach the braking element from the brake disc is measured and its value gives a precise estimation of the entity of the stiction phenomenon that has occurred.

BRIEF DESCRIPTION OF DRAWINGS

Preferred but not limiting embodiments will be now described in more detail with reference to a number of practical working examples of implementation thereof which are solely intended to disclose in a non-exhaustive and not limiting manner the feature which are part of the content of the present disclosure, and with reference to the figures of the attached drawings, in which.

DETAILED DESCRIPTION

Figure 1:
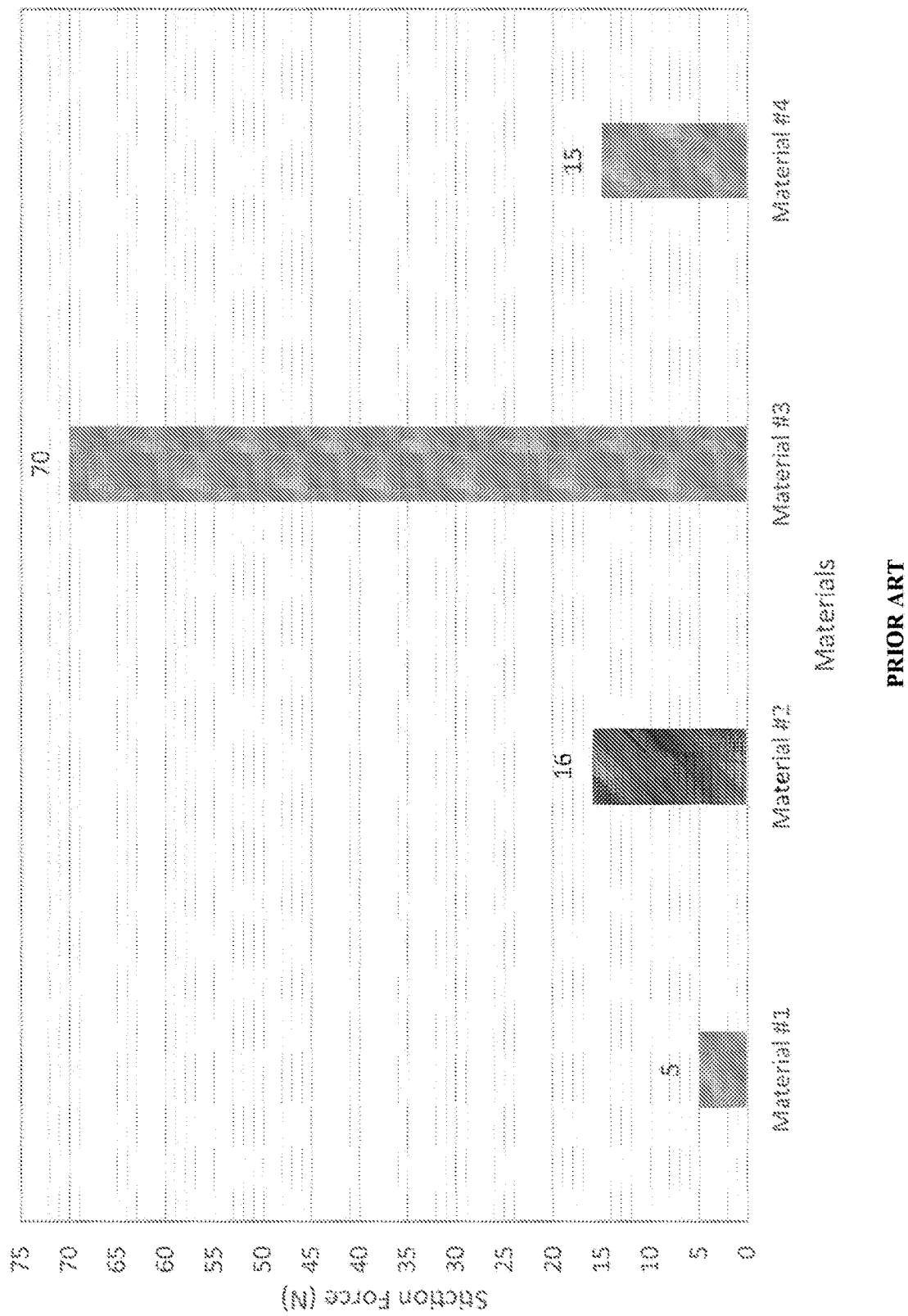
FIG. 1 is a graph showing the results of a series of experiments carried out according to the procedure discussed in EP3507587 on different friction materials.

In some embodiments, a friction block or layer made of an asbestos free friction material, in particular designed to be provided as an integral part of a vehicle brake pad comprises, as composing materials thereof, inorganic and/or organic and/or metallic fibers, at least a binder, at least a friction modifier or lubricant, and at least a filler or abrasive.

Materials pertaining to the above general categories are well known in the brake art and are chosen according to well known criteria in order to obtain specific properties, like wear resistance, stable friction coefficient during braking, fade and limited use of braking fluid.

Exemplary embodiments of fiber components can be, but are not limited to: inorganic fibers, such as glass fibers, rock wool, wollastonite, sepiolite, attapulgite, and/or metallic fibers, like stainless steel and zinc, and organic fibers, such as carbon fibers, aramid fibers, polyimide fibers, polyamide fibers, phenolic fibers, cellulose and acrylic fibers or PAN (polyacrylonitrile). This fibrous base can be utilized in short fiber or powder form.

Numerous materials known in the art can be used as organic or inorganic fillers. Exemplary embodiments include, but are not limited to, calcium carbonate precipitate, barium sulfate, magnesium oxide, calcium hydroxide, calcium fluoride, slaked lime, talc, molybdenum trioxide, zirconium silicate, iron oxide, mica, iron sulfide, silicon dioxide, vermiculite, rubber powder (rubber powder and granules), nitrile rubber powder (vulcanized product), metal powders (excluding copper and its alloys), acrylic rubber powder (vulcanized product). These materials can be used by themselves or in combinations of two or more of them. The quantity of such fillers loads is preferably comprised from 2% to 40% by volume based on the total composition of the friction material.

Exemplary embodiments of suitable binders include, but are not limited to, phenolic resins, melamine resins and epoxy resins; various modified phenolic resins, such as epoxy-modified phenolic resins, oil-modified phenolic resins, alkylbenzene-modified phenolic resins and acrylonitrile butadiene rubber (NBR). Any one of these compounds or combination of two or more of them may be employed used. The binder is included in a quantity preferably from 2% to 30% by volume based on the total composition of the friction material.

Exemplary embodiments of friction modifiers can include, but are not limited to, from 0% to 10% (or about 0% and about 10%) by volume of solid lubricants, such as tin sulfides, like SnS and $SnS_2$, cashew nut powder, rubber powder (pulverized tread rubber powder), a variety of non-vulcanized rubber particles, a variety of vulcanized rubber particles, an inorganic charge, such as barium sulfate, calcium carbonate, a calcium hydroxide, vermiculite and/or mica, an abrasive, such as silicon carbide, alumina, a zirconium silicate, a lubricant, such as molybdenum disulfide, a sulfide of tin as specified above, a zinc sulfide, iron and non-ferrous sulfides, metallic particles other than copper and copper alloys, and/or a combination of all of the above.

It can also be advantageous in some embodiments to include graphite and/or coke in the composition. The graphite (and/or coke) can be added in an appropriately selected quantity, which preferably can comprise between 2% and 15% by volume of the total composition of friction material. Embodiments of the friction materials to which the present disclosure applies include those known as non-asbestos-organic (NAO) friction material.

The graphite (and/or coke) can be added in an appropriately selected quantity, which can comprises between 2% and 15% (or about 2% and about 15%) by volume of the total composition of friction material.

The fibers can be utilized in short fiber or powder form. In some embodiments, the fibers can have a total fiber length of between 0.5 and 1.5 (or between about 0.5 and about 1.5) mm and a fiber diameter from 40 to 150 microns, though the particular dimensions are not limiting.

The quantity of the fillers can comprise 2% to 40% by volume based on the total composition of the friction material.

The binder can be included in a quantity from 2% to 30% by volume based on the total composition of the friction material.

Exemplary embodiments of suitable abrasives may be subdivided in mild, medium and strong abrasives and may consist in any one or more of the flowing materials, without the following list be considered exhaustive or limiting in any manner:

Mild abrasives (Mohs 1-3): talc, calcium hydroxide, potassium titanate, mica, kaolin Medium abrasives (Mohs 4-6): barium sulfate, magnesium oxide, calcium fluoride, calcium carbonate, wollastonite, calcium silicate, iron oxide, silica, chromite, zinc oxide Strong abrasives (Mohs 7-9): silicon carbide, zirconium sand (zirconium oxide), zirconium silicate, zirconia, corundum, alumina, mullite.

The ratio between the abrasives and lubricants is between 3 and 10. In some embodiments, the ratio can be equal to 6 (or about 6).

The friction material composition according to the disclosure may comprise aramid fibers, the ratio between the binder and the aramid fibers being between 0.5% and 8% (or about 0.5% and about 8%) by volume. In some embodiments, the ratio can be equal to 5 (or about 5).

According to embodiments of the disclosure, the asbestos free friction material also contains, as an additional composing material or additive, an hydrophobic wax, the relative quantity of the hydrophobic wax with respect to the aforementioned other material components being chosen, depending on the chemical nature and quantity of the other composing materials of said asbestos free friction material, such that the asbestos free friction material block or layer possesses, after forming, a hydrophobicity, defined, by the method that will be described herein below, as the time of absorption within the friction material of a liquid drop formed by 20+/−5 μL of distilled water, of more than 60 minutes.

According to embodiments of the disclosure, an asbestos free friction material contains, as an additional composing material or additive, an hydrophobic wax, the hydrophobic wax being preferably in the form of a solid powder, having a melting point higher than 110° C. and chemically stable at high temperatures and pressures.

For chemically stable is meant that the molecule of the wax is not subjected to decomposition. For "high temperature and pressures" is meant temperatures and pressures of the magnitude of hundredths of centigrade degrees and of kg/cm$^2$, respectively.

According to embodiments of the disclosure, an asbestos free friction material contains, as an additional composing material or additive, an hydrophobic wax chosen in the non-limiting group consisting of: Polyethylene (PE) wax, high density PE (HDPE) wax, Polypropylene wax, micronized PE wax, oxidized PE wax, Polytetrafluoroethylene (PTFE) modified polyethylene wax, Micronized Amide wax, Micronized Polypropylene wax, Special wax (bonding wax, modified PE wax, PTFE texture powder).

The hydrophobic wax can be present in the asbestos free friction material in a quantity comprised between 0.5% and 5% (or about 0.5% and about 5%) calculated in volume on the total quantity of the friction material. In some embodiments, the wax can be in a quantity comprised between 1.0% and 2.0% (or about 1.0% and about 2.0%) by volume.

The friction block or layer of an asbestos free friction material according to any of the aforementioned possible embodiments may possess none or low tendency to stitch in use against a surface of a friction partner thereof, typically a vehicle brake disc when the friction material block or layer is an integral part of/is included in a brake pad. In particular, according to embodiments of a test described in details in the present disclosure, the friction block or layer is electrochemically stitched against a metal surface of steel, iron or cast iron by thrusting the friction material block or layer against the metal surface and then an electrochemical corrosive phenomenon is provoked thereupon. According to this test, any of the embodiments of the friction material block or layer according to the disclosure can show a detachment force from the metal surface of less than 15 (or about 15) Newton, indicating a low or nil tendency to stiction.

The asbestos free friction material block or layer can be incorporated in a vehicle brake pad designed to cooperate in use with a vehicle brake disc made of iron, steel or cast iron, the vehicle brake pad being operatively associated in use with the vehicle brake disc, though the particular material is not limiting.

When the asbestos free friction material block or layer contains as a component material thereof from 0.5% to 5% by volume of a hydrophobic wax having a melting point higher than 110° C., the resulting friction partners consisting in the vehicle brake pad and in the vehicle brake disc are not subjected to stiction in use or are subjected to a very limited stiction phenomenon that allows the two friction partners to be easily separated with a low force, such as lower than 15 Newton.

The hydrophobic wax is to be chosen in the group consisting of: Polyethylene wax, HDPE wax, Polypropylene wax, micronized PE wax, oxidized PE wax, PTFE modified polyethylene wax, Micronized Amide wax, Micronized Polypropylene wax, Special wax (bonding wax, modified PE wax, PTFE texture powder) in an amount such that the brake pad has a reduced or nil tendency to stiction, especially under damp weather.

The present disclosure also relates to the use of a hydrophobic wax in an asbestos free friction material containing as further component materials thereof inorganic and/or organic and/or metallic fibers, at least a binder, at least a friction modifier or lubricant and at least a filler or abrasive, the hydrophobic wax being contained in the asbestos free friction material in a quantity comprised between 0.5% and 5% (or about 0.5% and about 5%) in volume calculated on the total volume of the friction material and such that the asbestos free friction material shows a reduced or nil tendency to stiction, especially under damp weather.

The present disclosure also relates to a method for manufacturing brake pads for vehicles having a reduced or nil tendency to stitch against the friction surface of an associated brake disc, i.e. a reduced or nil tendency to stiction, especially under damp weather. The method comprising the steps of:

i)—preparing a test quantity of an asbestos free friction material, especially of the NAO kind, by mixing together respective component materials including inorganic and/or organic and/or metallic fibers, at least a binder, at least a friction modifier or lubricant and at least a filler or abrasive;

ii)—adding in step i) as a further component material a predetermined quantity of a hydrophobic wax to be mixed together with the said component materials of step i);

iii)—forming a solid block or layer of said asbestos free friction material containing said hydrophobic wax by pressing and heating the component materials mixed together in a mold, to form a pad;

iv)—subjecting the pad to an hydrophobicity test consisting in measuring the adsorption time thereupon of a liquid drop formed by 20+/−5 μL of distilled water;

v)—repeating the steps i) to iv) using different predetermined quantity of said hydrophobic wax;

vi)—industrially producing brake pads using asbestos free friction materials containing said hydrophobic wax having a chemical composition identical to those test friction materials produced by previous steps i)-v) and having shown a water drop adsorption time in step iv) of more than 60 minutes.

The present disclosure further relates to a method for manufacturing brake pads for vehicles having a reduced or nil tendency to stitch against the friction surface of an associated brake disc, i.e. a reduced or nil tendency to stiction, especially under damp weather, the method comprising the steps of:

i)—preparing an asbestos free friction material, especially of the NAO kind, by mixing together respective component materials including inorganic and/or organic and/or metallic fibers, at least a binder, at least a friction modifier or lubricant and at least a filler or abrasive;

ii)—adding in step i) as a further component material a quantity of a hydrophobic wax to be mixed together with the said component materials of step i), the hydrophobic wax being chosen in the group consisting in: Polyethylene (PE) wax, high density PE (HDPE) wax, Polypropylene wax, micronized PE wax, oxidized PE wax, Polytetrafluoroethylene (PTFE) modified polyethylene wax, Micronized Amide wax, Micronized Polypropylene wax, Special wax (bonding wax, modified PE wax, PTFE texture powder) and the hydrophobic wax being added in the asbestos free friction material in a quantity comprised between 0.5% and 5% (or about 0.5% and about 5%) calculated in volume on the total quantity of the friction material, and preferably in a quantity comprised between 1.0% and 2.0% (or about 1.0% and about 2.0%) by volume.

iii)—forming a solid block or layer of said asbestos free friction material containing said hydrophobic wax by pressing and heating the component materials mixed together in a mold, to form a pad.

Figure 6:
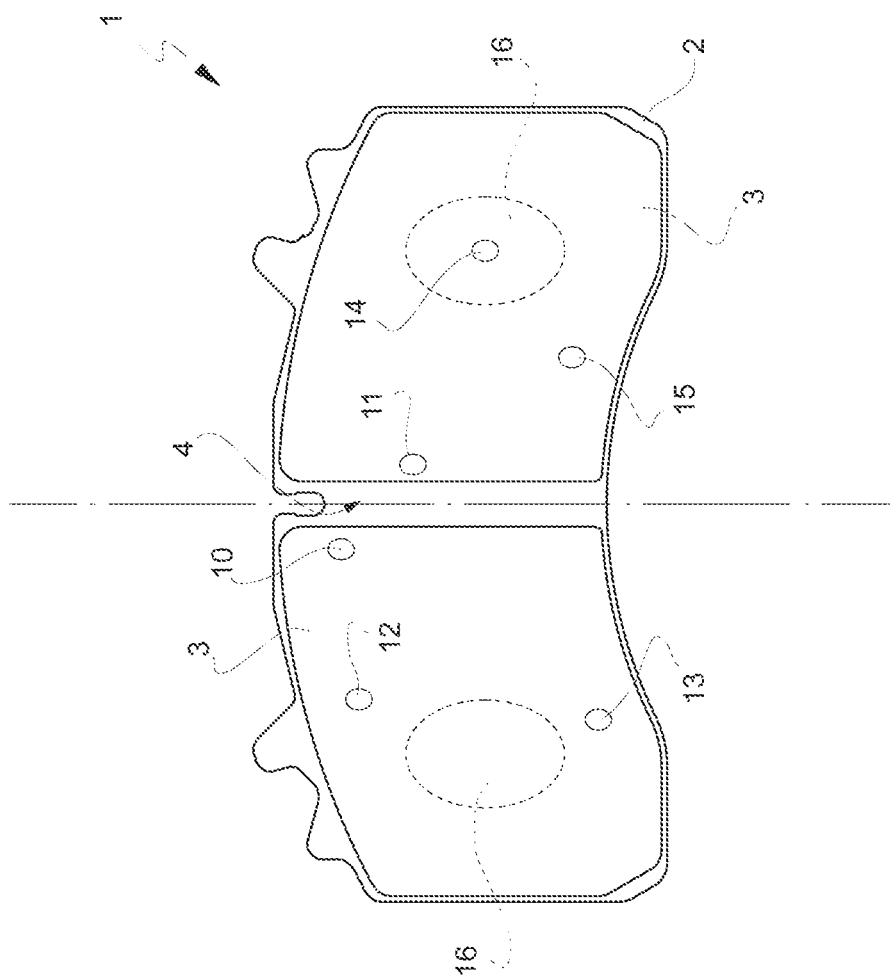
FIG. 6 shows an exemplary non-limiting embodiment of a brake pad manufactured according to the disclosure and wherein respective test areas to check the hydrophobicity of the friction material thereof are highlighted.

A possible and non-limiting embodiment of a brake pad manufactured according to the disclosure is shown in a schematic manner in FIG. 6.

FIG. 6 shows a plan view from above of a brake pad 1 comprising a metallic support or "back-plate" 2 and at least one pad or block or layer 3 of cured friction material. The back-plate is made in a ferrous material, typically iron or steel, but can be also made in a light alloy, like an age-hardened Al alloy.

In the non-limiting example shown, the brake pad 1 has two blocks or pads 3 of friction material arranged side by side and made integral with the back-plate 2, e.g. co-molded upon it or glued to it after curing. Of course, in some embodiments it may be possible to have one single block or pad (or layer) of friction material made integral with the back-plate and large enough to cover almost a whole surface 4 of the back-plate 3 facing in use an element to be braked, like a brake disc, known and not shown for sake of simplicity.

In FIG. 6, the brake pad 1 is shown with respective points of test highlighted by small circles and numbered from 10 to 15. At least two points of test, namely points 10,11, are arranged close to, or at, a median portion of the brake pad 1, while the remaining points of test are distributed evenly on both the two blocks or pads 3 of friction material, preferably close to, or at, respective opposite regions 16 of the blocks or pads 3, highlighted in FIG. 6 as dotted ovals.

The points 10-15 are used in a hydrophobicity test developed by the technicians of the Applicant, as will be described in more details herein below, in order to test the time of adsorption of drops of distilled water within the blocks or pads 3 of friction material, since this measurement, as it will be seen, may be related to the tendency of the brake pad 1 to be subject to the stiction phenomenon, i.e. to stitch in use against the surface of a friction partner of the brake pad, namely a friction surface of a brake disc.

Figure 7:
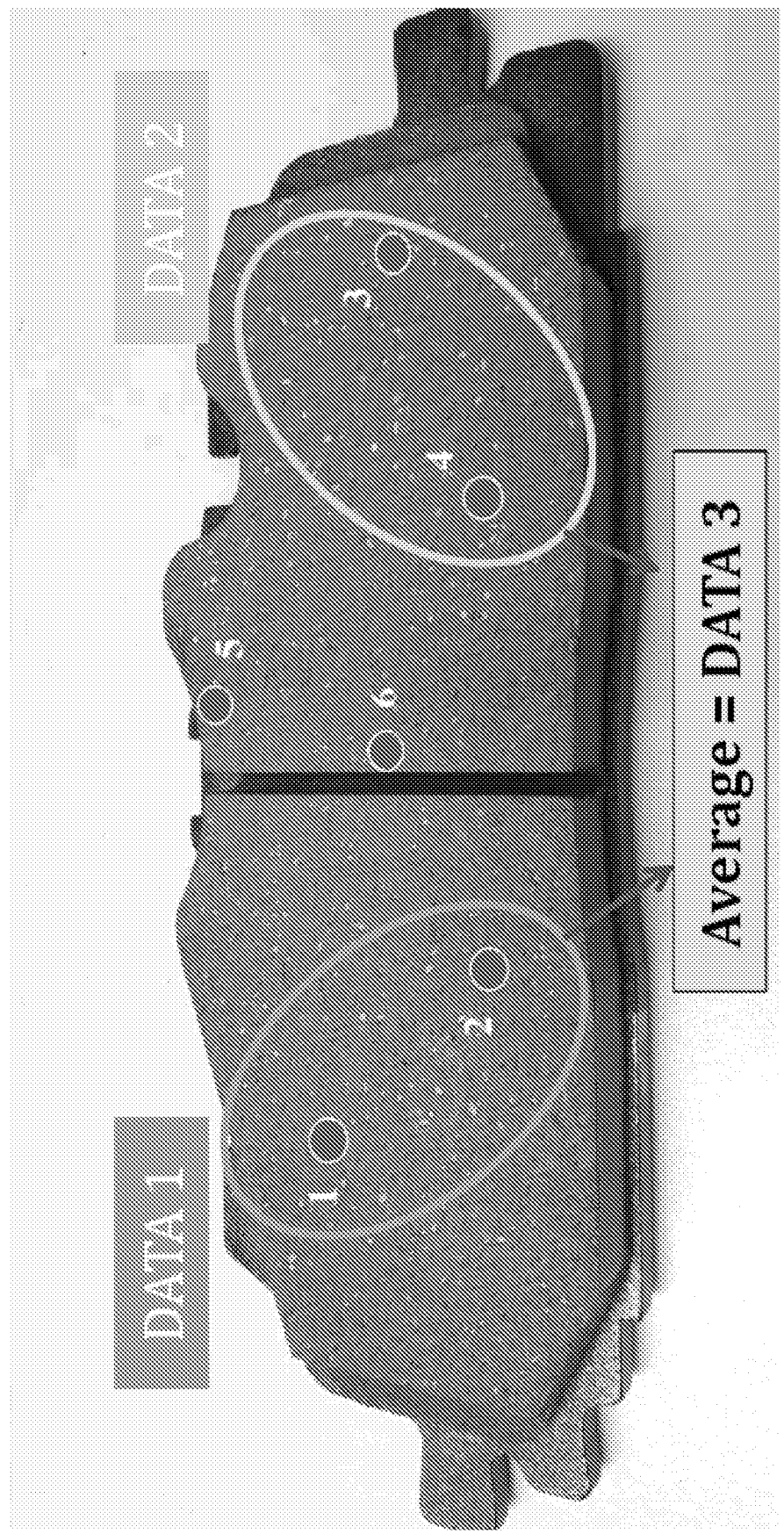
FIGS. 7 and 8 shows a practical example of implementation of the test method for determining the hydrophobicity of a brake pad manufactured according to the disclosure.

FIG. 7 shows a picture of a real brake pad produced as it will be described and corresponding substantially to the brake pad 1 shown in a schematic manner only in FIG. 6, and wherein the employed points of test are shown as small circles and are numbered from 1 to 6.

Figure 8:
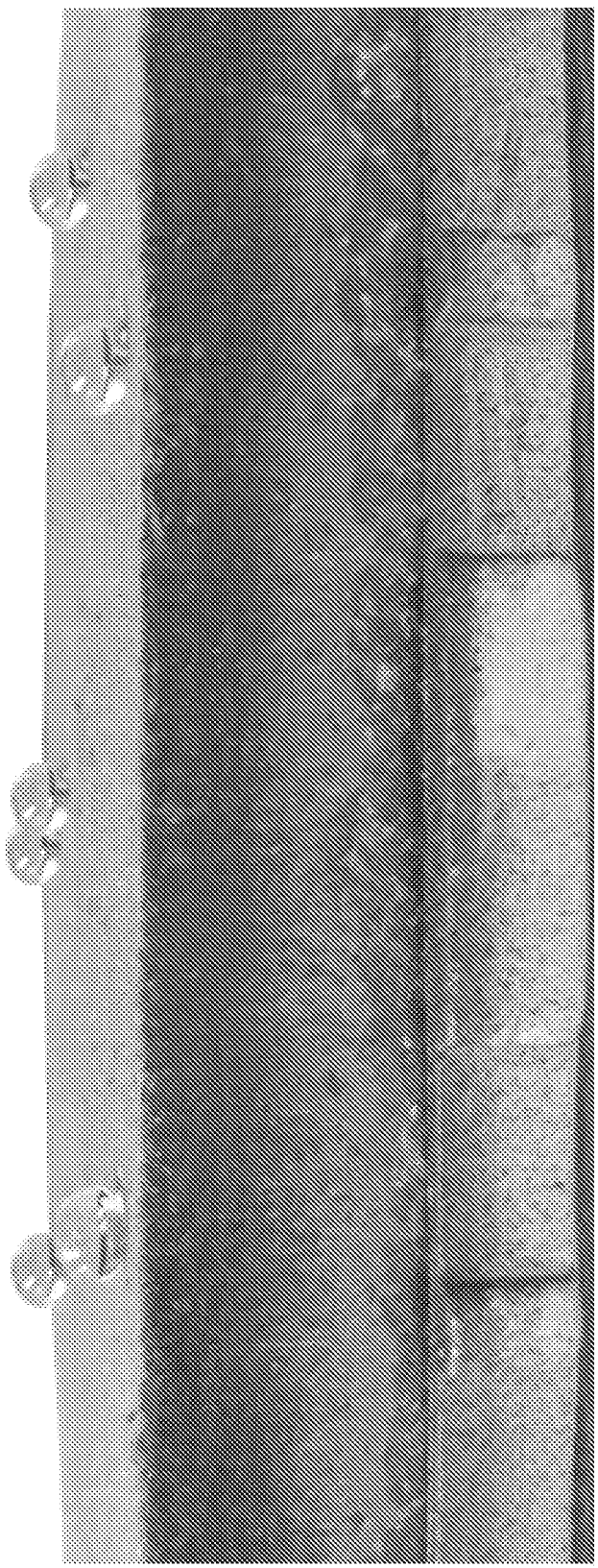

FIG. 8 is a picture of the brake pad of FIG. 7 during the execution of the hydrophobicity test as it will be seen in more details in the working examples.

Figure 9:
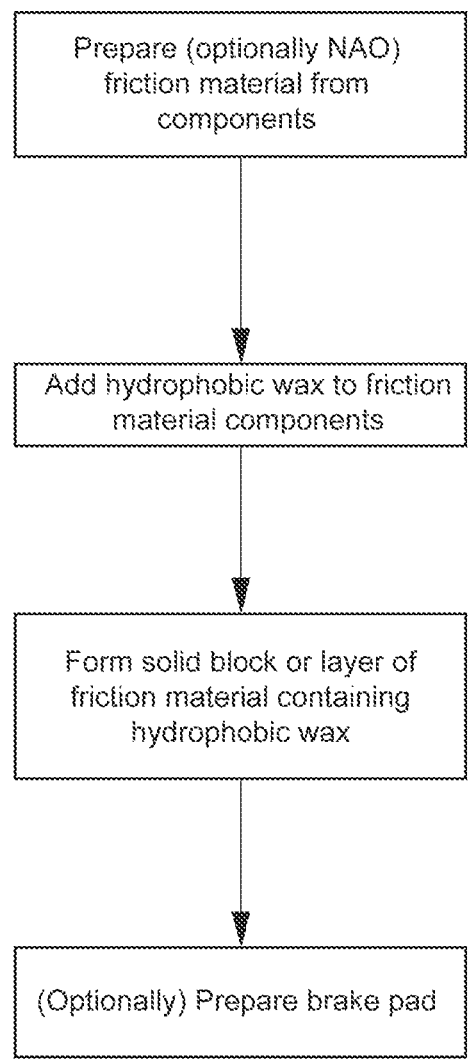
FIG. 9 is a flowchart depicting a method of making friction material according to embodiments described herein.

FIG. 9 is a flowchart depicting a method of making friction material according to embodiments described herein. The various steps of the method as briefly disclose above are shown as blocks arranged sequentially and the explanation of what happens in each step is inserted within the respective block.

The disclosure will now be completed by the content of the following non-limiting working operative examples.

Example 1

Different compositions of friction materials were prepared, all these friction materials being of the NAO Cu-free typ, and all of which are asbestos free.

The general, generic composition of the friction materials prepared are given in Table 1 wherein the indicated composing materials may be mixed together in different combinations.

TABLE 1

| Formula | #1 Material % Vol | #2 Material % Vol | #3 Material % Vol | #4 Material % Vol |
| --- | --- | --- | --- | --- |
| Fibers | 6 | 8 | 6 | 6 |
| Organic Additives | 15 | 14 | 8 | 14 |
| Resin | 20 | 20 | 17 | 21 |
| Strong abrasive | 12 | 12 | 11 | 12 |
| Medium abrasive | 12 | 12 | 18 | 13 |
| Mild abrasive | 21 | 21 | 28 | 20 |
| Sulfides | 3 | 4 | 3 | 3 |
| Carbon | 9 | 8 | 9 | 9 |
| Hydrophobic wax | 2 | | | |
| Metal | | 1 | | |
| Hydrophobic Additive (1) | | | | 2 |

(1) Silica powder coated with a siloxane

In Table 1, for the mild, medium and strong abrasives, one or more materials were chosen as indicated below:

Mild abrasives (Mohs 1-3): talc, calcium hydroxide, potassium titanate, mica, kaolin;

Medium abrasives (Mohs 4-6): barium sulfate, magnesium oxide, calcium fluoride, calcium carbonate, wollastonite, calcium silicate, iron oxide, silica, chromite, zinc oxide;

Strong abrasives (Mohs 7-9): silicon carbide, zirconium sand (zirconium oxide), zirconium silicate, zirconia, corundum, alumina, mullite.

Starting from the general, operative compositions listed in Table 1, friction material compositions are prepared in a test quantity, molded in pads and subjected to the stiction test as described in EP3507587, the content of which is hereby incorporated as a whole by reference.

The test results are shown in the graph of FIG. 1, in terms of force necessity to detach the friction material pad under examination from a fragment of a commercial brake disc.

Friction material composition #4 contains the hydrophobic additive to counter the creep groan phenomenon as described in WO 2019/171325. Friction material #2 corresponds to a known composition known as to be substantially free from the stiction phenomenon. The composition #1 contain a hydrophobic wax Finally, the composition #3 corresponds to a known composition, and known as to be substantially subjected to the stiction phenomenon.

The hydrophobic wax tested are comprised in the following, non-limiting and non-exhaustive list:
Polyethylene wax
HDPE wax
Polypropylene wax
PE wax micronized
PE wax oxidized
PTFE modified polyethylene wax
Micronized Amide wax
Micronized Polypropylene wax
Special wax (bonding wax, modified PE wax, PTFE texture powder)

As it can be seen all the composition containing a hydrophobic wax (the results for different hydrophobic waxes were completely superimposable) present a detachment force lower than 15 Newton, which correspond to a low stiction risk and generally even lower than 10, which means almost nil risk of stiction. It has been proved by further tests carried on real brake pads mounted on a car and subjected to a braking action, as will be described later on, that the values of detachments force comprised between 15 and 30 correspond to a real stiction risk, in the sense that stiction may occur under specific and/or severe environmental conditions (ie. Humidity, temperature, contaminants, salt . . . ) and brake dynamics conditions (high temperature clamping, etc.). Values above 30 correspond to a severe stiction surely occurring under less severe or specific environmental and/or brake dynamic conditions.

Example 2

Further friction material compositions were prepared as shown in Table 2 below.

Material #1 of Table 2 is the same as material #1 of Table 1, containing 2.0% vol of Polyethylene wax, also referred to herein below as "composition W", while material #5 of table 2 corresponds to a composition identical to that of material #1 but without wax and wherein the content of the medium abrasive has been increased by 2% vol to compensate.

TABLE 2

| Formula | #1 Material - with wax (W) % Vol | #5 Material = to #1 but no wax % Vol |
|---|---|---|
| Fibers | 6 | 6 |
| Organic Additives | 15 | 15 |
| Resin | 20 | 20 |
| Strong abrasive | 12 | 12 |
| Medium abrasive | 12 | 14 |
| Mild abrasive | 21 | 21 |
| Sulfides | 3 | 3 |
| Carbon | 9 | 9 |
| Hydrophobic wax | 2 | |
| Metal | | |
| Hydrophobic Additive (1) | | |

(1) Silica powder coated with a siloxane

Materials #1 and #5 of Table 2 were molded onto identical metal substrates/supports and cured in a conventional manner, in order to form identical brake pads. The only difference consisting in that composition #5 does not contain a hydrophobic wax and is used as a Reference, while the corresponding composition W under test contain 2.0% in volume of a commercial polyethylene wax in place of a corresponding amount of medium abrasive.

The brake pad pressing was performed at a temperature of between 60 and 200° C. at a pressure from 150 to 1800 kg/cm2 for a duration of between 3 and 10 minutes or else in preforming the mixing within a die and thereafter pressing at a temperature from 130 to 180° C. at a pressure from 150 to 500 kg/cm2 (14.7-49 MPa) for a duration of from 3 to 10 minutes.

The resulting pressed article is typically post-cured by means of heat treatment from 150 to 400° C. for a duration of between 10 minutes to 10 hours, it is then spray painted or powder-painted, kiln-dried and possibly machined where necessary to produce the final product.

The effective braking area of each single pad is 26.8 cm$^2$.

Example 3

The brake pads thus obtained by means of the friction material compositions #5 and W were subjected to the following test:
A—Hydrophobicity Test (Falling Water Adsorption Test)

The following operations were performed on each brake pad constituting a test sample:
Blowing and cleaning the raised surface of the brake pad (surface intended to come into contact with the brake disc);
Drying the sample at 105° C. for 2 hours;
Cooling the sample down to a temperature of 10-30° C.;
Applying to a same point of the brake pad 20+/−5 µL of distilled water;
Measuring the period of time required for complete absorption;

In order to get a reliable measurement, independent of possible anisotropy of the molded friction material, the test is carried out on multiple points of the brake pad, e.g. points 10-15 as indicated in schematic manner in FIG. 6. With reference to FIG. 7, moreover, the overall value of hydrophobicity, expressed in minutes, is not calculated as a mere arithmetic average value among the measures corresponding to the different test points, but in the following manner, as also schematized in FIG. 7:
DATA 1: is the average number between point 1 and 2
DATA 2: is the average number between point 3 and 4
DATA 3: is the average number between DATA 1 and DATA 2

AVERAGE ADSORPTION TIME: is given as the average between the measured values in point 5, point 6 and the value of DATA 3.

The results are reported in Table 3:

TABLE 3

| Material | Drop absorption time (min) |
|---|---|
| Reference - No wax | 42 |
| Wax | 72 |

FIG. 8 shows a moment of the test, wherein the drops of distilled water have been poured upon the brake pad friction material block. As it may be seen the drops forms with the surface of the friction material block or pad an angle, the measure of which is usually taken as the measurement unit for hydrophobicity. However, in the present case, not the hydrophobicity at the surface but the hydrophobicity of the friction material block or pad as a whole is to be measured, so that the "traditional" measurement unit would be inappropriate. Accordingly the test described above in details has been developed and proved to be simply to be carried out and reliable.

Example 4

Figure 2:
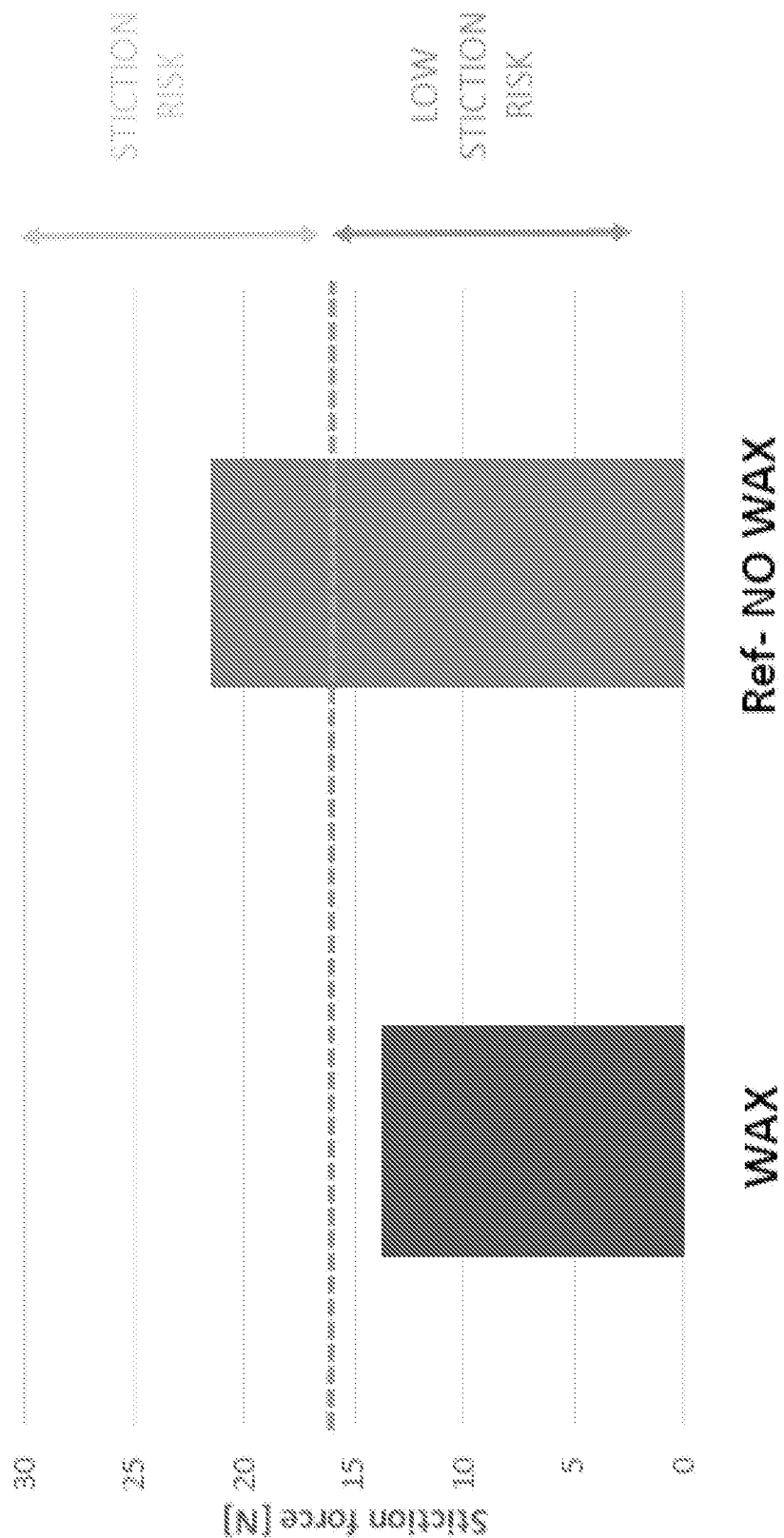
FIG. 2 is a graph showing the results of an experiment carried out according to the procedure discussed in EP3507587 on the same friction materials with and without an additional component (an additive) object of the present disclosure.

Some brake pads obtained by means of the friction material compositions #5 and W were subjected to the stiction test according to EP3507587. The results obtained are shown in FIG. 2 and in Table 4 below:

TABLE 4

| Material | Stiction force (N) |
|---|---|
| Reference - No wax | 21 |
| Wax | 13 |

As it can be seen, the test result is fully coherent with that reported in FIG. 1. The mere addition to 2% of hydrophobic wax to a specific composition brings the detachment force from 21 to 13, indicating the passage from a condition of stiction risk to a condition of very low risk.

Further experiments that are not reported in details for sake of simplicity have shown that adding a higher or lower quantity or wax or varying the type of wax allow the detachment force value to be lowered below 10, as shown in FIG. 1.

Example 5

Some brake pads obtained by means of the friction material compositions #5 and W were subjected to a vehicle test carried out according to the following protocol:
  Install on the vehicle new disc and the pads
  Made a bedding with 10 brake stop application from 50 km/h to 0 km/h
  Spray 2 liters of water for each wheel, turning the wheel during spraying
  After 6 night parking, measure torque with torque wrench
  Without changing brake pads and rotors, perform 50 brake application (from 50 km/h to 0 km/h) in the city traffic
  Repeat point 4 and 5 then perform recovery bedding in the city traffic; verify that the disc surface is free from corrosion.

Figure 3:
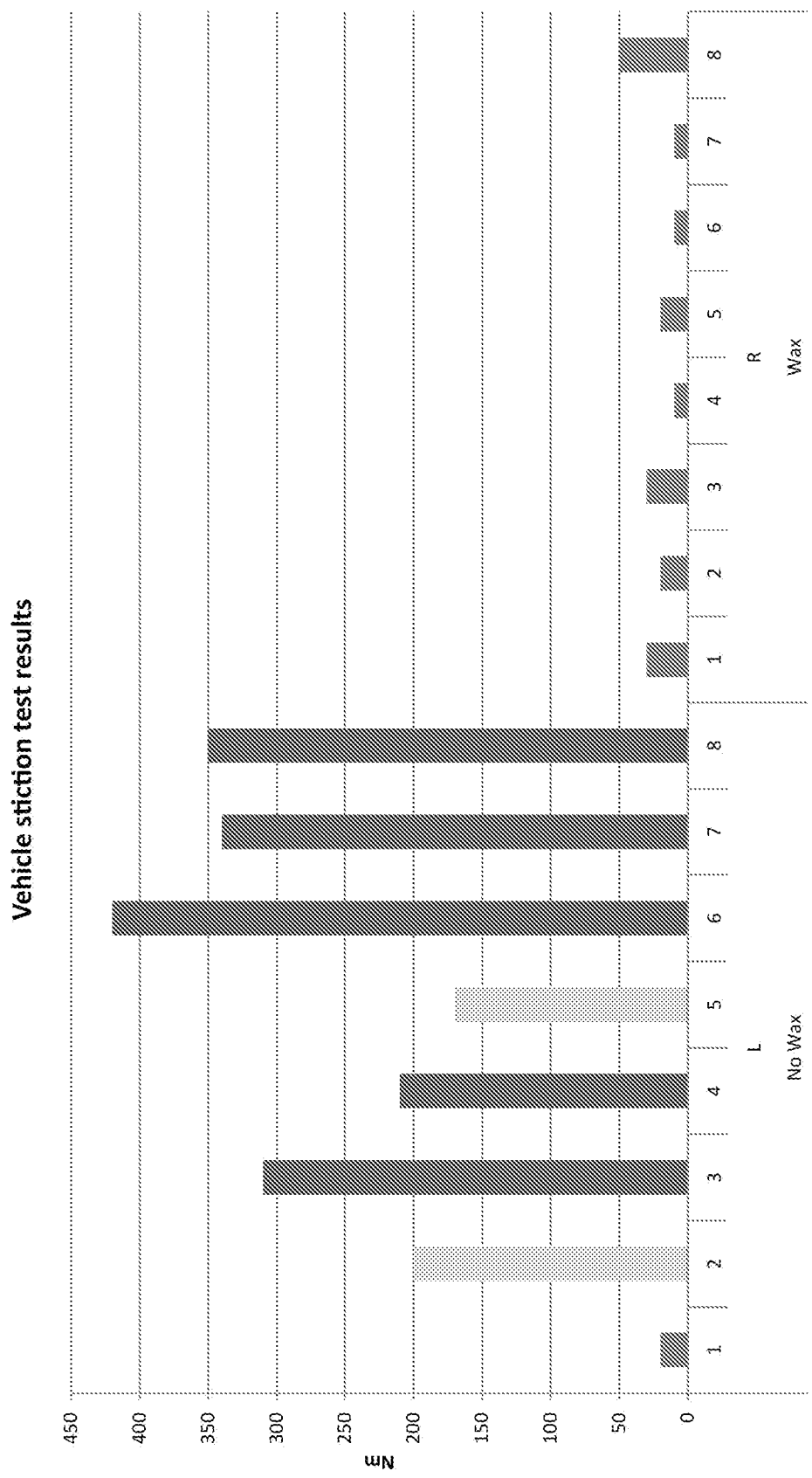
FIG. 3 is a graph showing the results of braking experiments carried out on a vehicle under different braking conditions using brake pads made with a same friction material either including or not including the additional component (an additive) object of the present disclosure.

The results of the torque verification by means of the torque wrench are reported in FIG. 3, expressed in Nm (Newton per meter).

As it can be seen, even taking into account random variations in the different experiments, the values of torque measured on the brake pads provided with friction material blocks or pads containing the hydrophobic wax in the composition are dramatically lower than those of brake pads having friction material blocks of the same composition but without the wax.

Example 6

Some brake pads obtained by means of the friction material compositions #5 and W were subjected to various standard AK-Master tests according to the SAE J2522 standard.

Figure 4A:
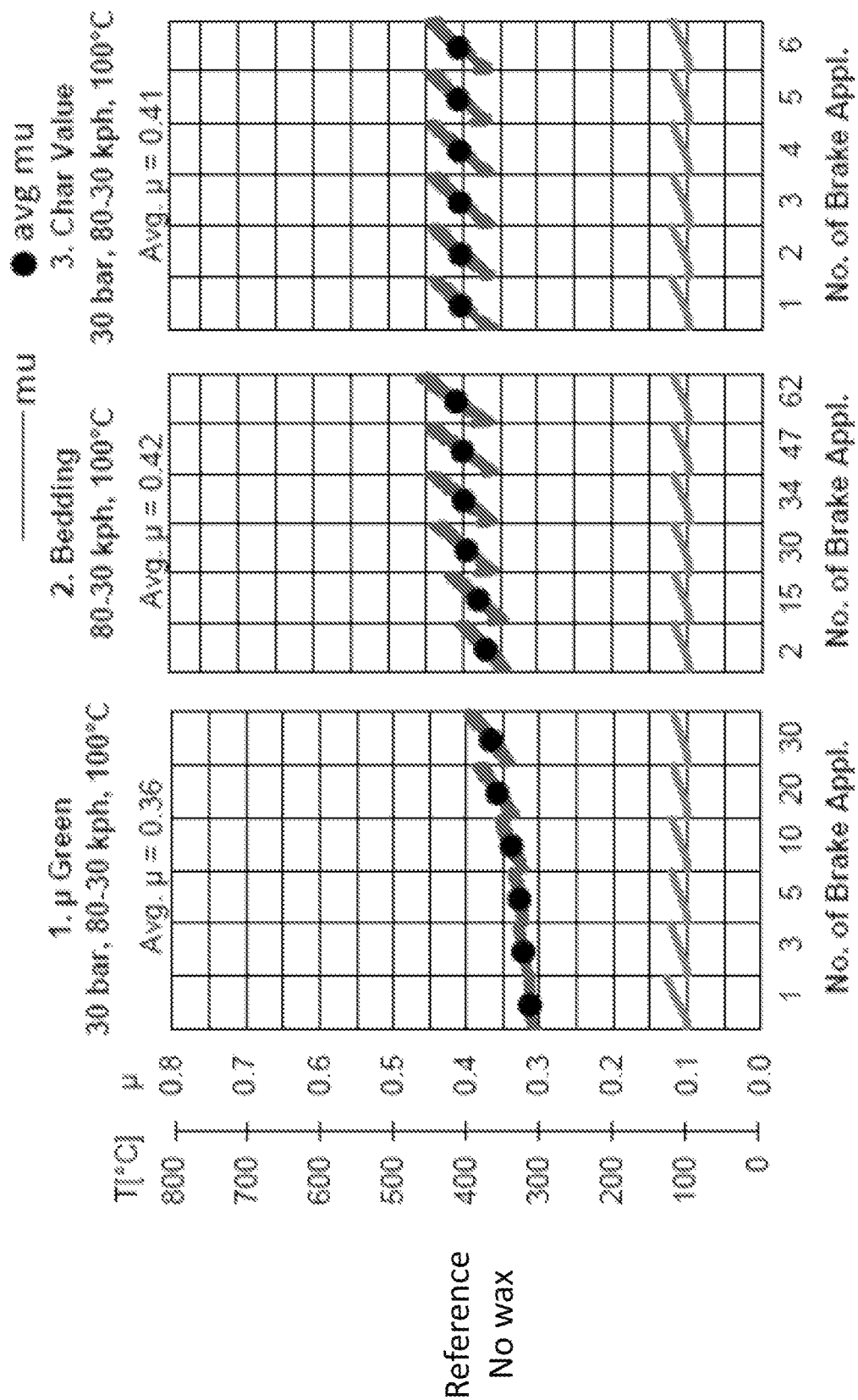
FIGS. 4 A,B,C and 5 A,B,C show the comparative results of an AK Master standard test carried out on brake pads of the same type and dimensions and provided with a friction material block having the same composition but, respectively, not incorporating and incorporating an additional component material or "additive" according to the disclosure.
Figure 4B:
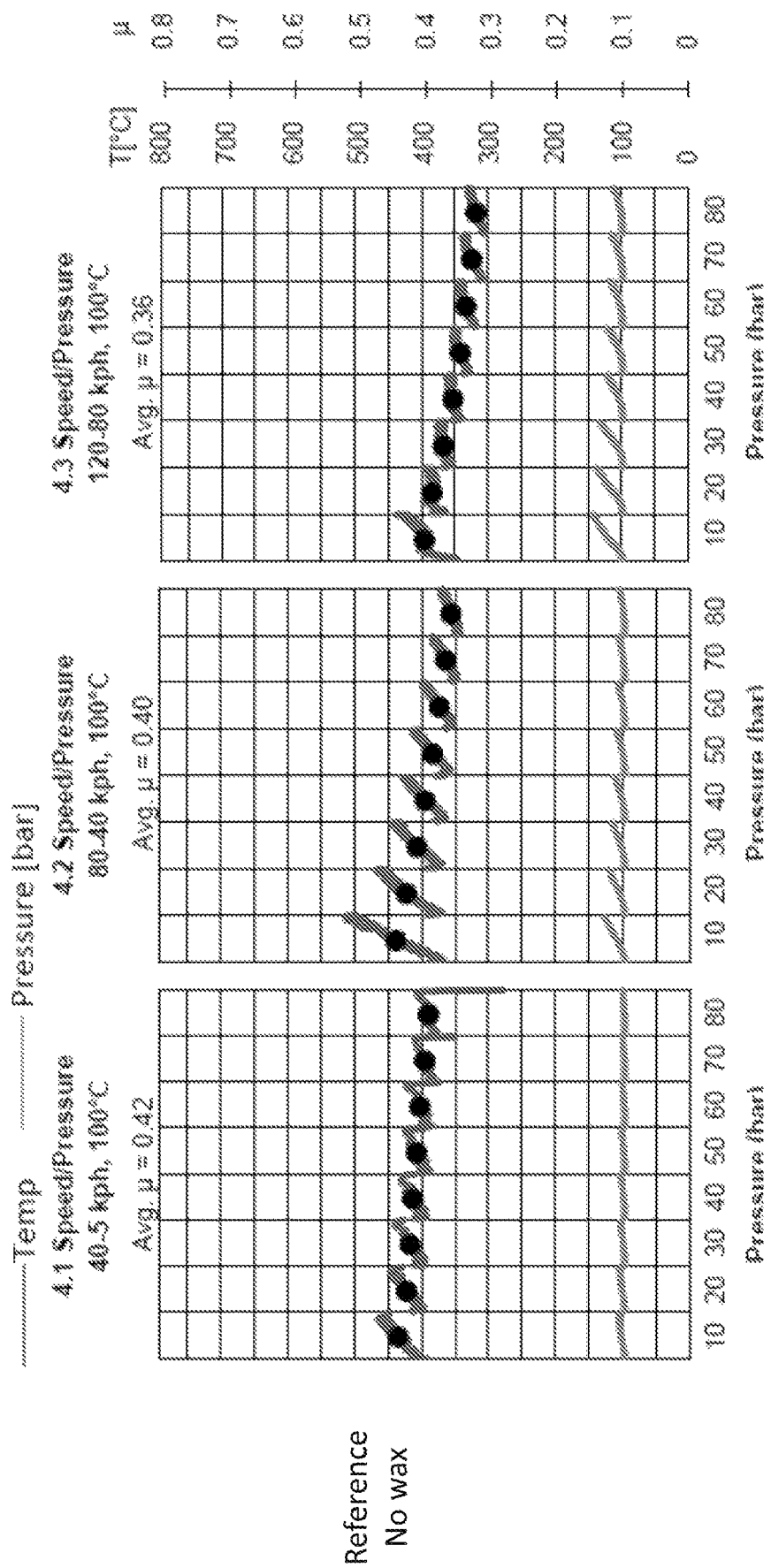
Figure 4C:
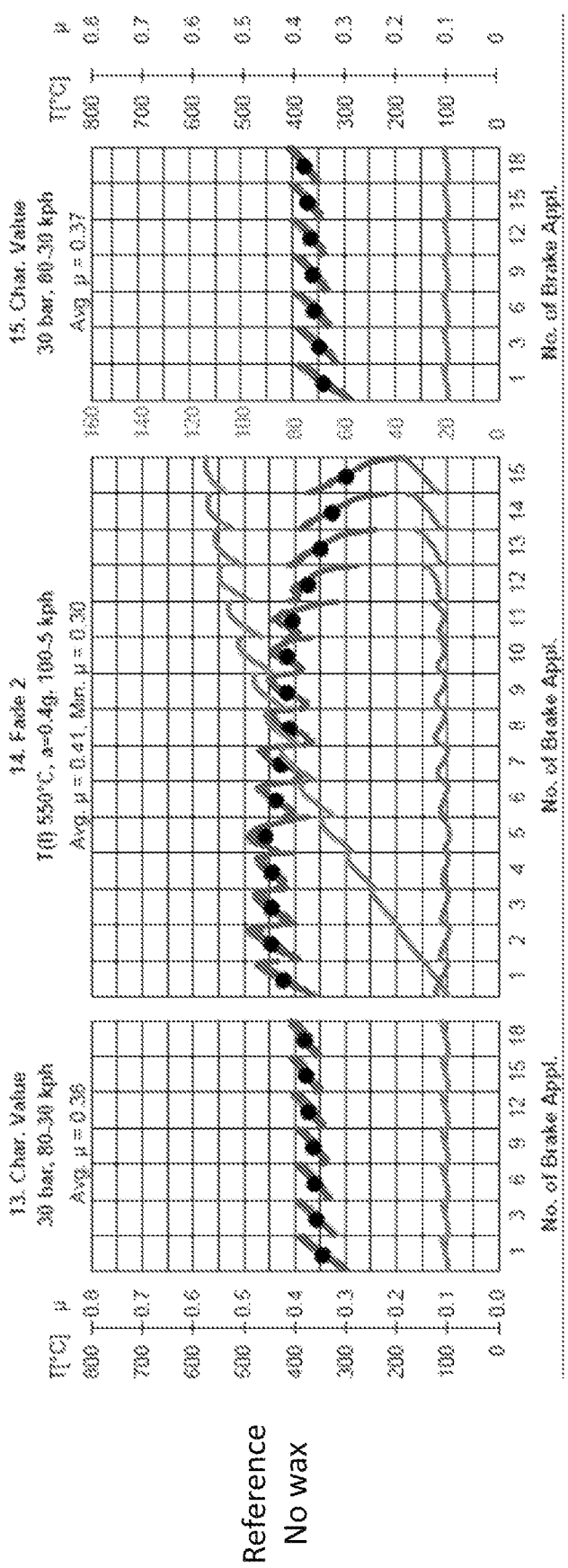
Figure 5A:
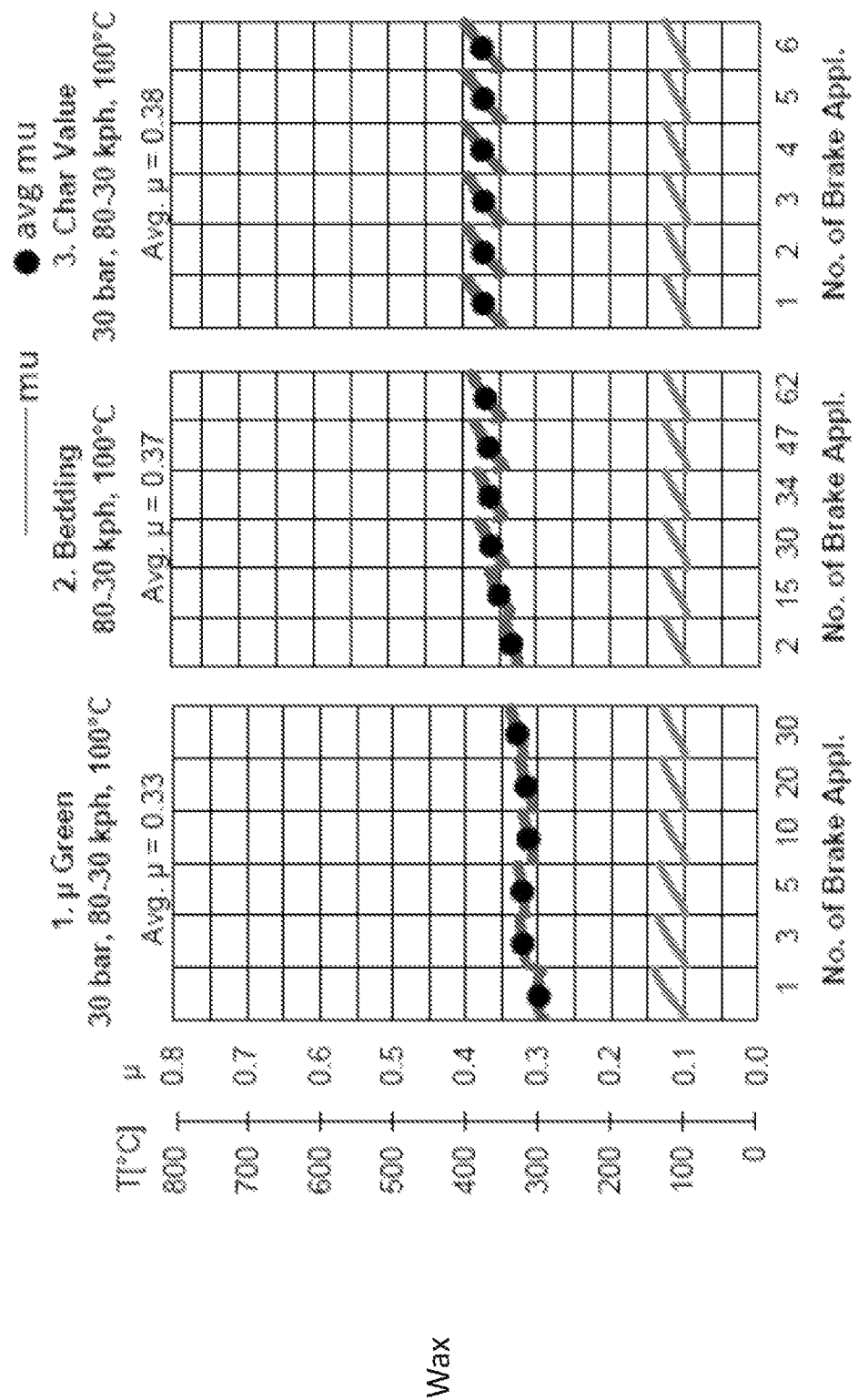
Figure 5B:
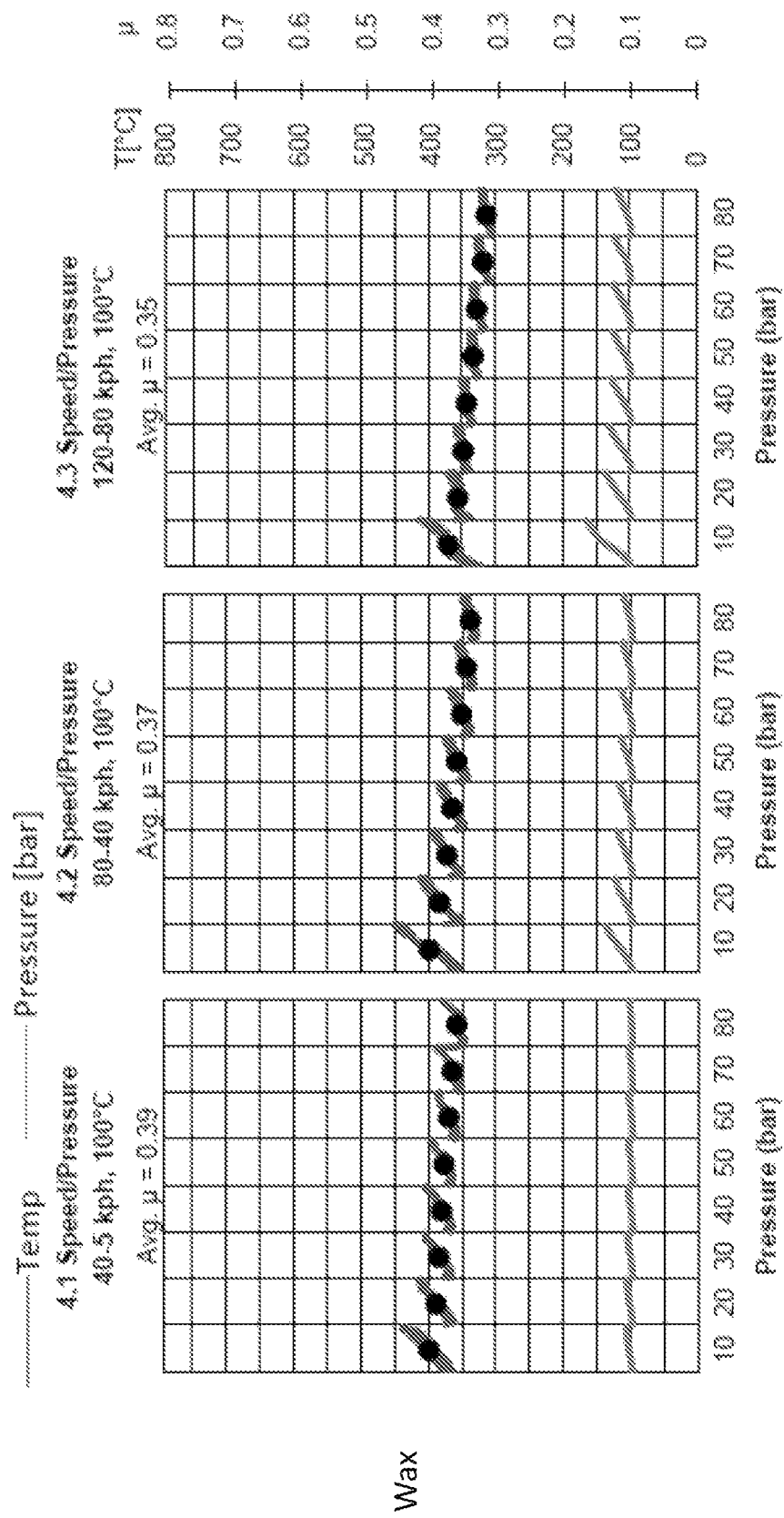
Figure 5C:
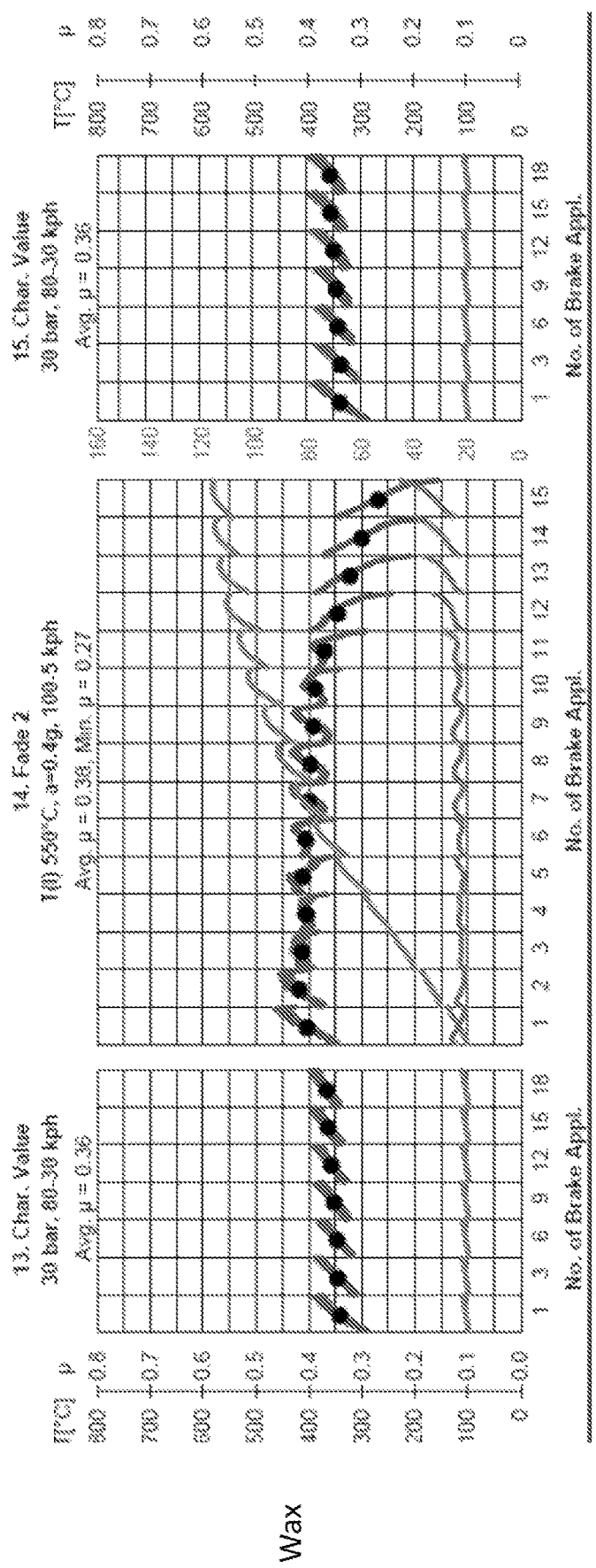

Summary and significant charts of the tests performed are shown in FIGS. 4 A,B,C for the brake pads made of a friction material without wax and 5 A,B,C for the brake pads made of a friction material of the same composition but including 2% of hydrophobic wax.

As it can be immediately appreciated, both the brake pads with hydrophobic wax and the brake pads without hydrophobic wax show similar braking behavior. This is the confirmation that the addition of an hydrophobic wax to a standard friction material does not impair the braking performances thereof.

The wear of the brake pads and of the brake disc have been also evaluated, expressed as different in weight of each component before and after the AK-Master test. The results obtained are reported in the following tables 5 and 6.

TABLE 5

| | NO WAX | | | | | | | | | |
|---|---|---|---|---|---|---|---|---|---|---|
| | Inboard Pad Thickness (mm) | | | | | | | | | |
| | 1 | 2 | 3 | 4 | 5 | 6 | 7 | 8 | Average | Mass (gram) |
| Initial | 14.291 | 14.336 | 14.374 | 14.386 | 14.378 | 14.321 | 14.296 | 14.324 | 14.34 | 221.40 |
| Final | 14.244 | 14.175 | 14.227 | 14.329 | 14.332 | 14.201 | 14.171 | 14.246 | 14.24 | 219.0 |
| Loss | 0.047 | 0.161 | 0.147 | 0.057 | 0.046 | 0.120 | 0.125 | 0.078 | 0.10 | 1.60 |
| | Tangential | | | Radial | | | Cup | | | |
| | — | | | — | | | — | | | |

TABLE 5-continued

NO WAX

Outboard Pad Thickness (mm)

|         | 1      | 2      | 3      | 4      | 5      | 6      | 7      | 8      | Average | Mass (gram) |
|---------|--------|--------|--------|--------|--------|--------|--------|--------|---------|-------------|
| Initial | 14.407 | 14.428 | 14.396 | 14.343 | 14.303 | 14.377 | 14.404 | 14.372 | 14.38   | 218.60      |
| Final   | 14.257 | 14.227 | 14.172 | 14.124 | 14.245 | 14.327 | 14.388 | 14.348 | 14.26   | 216.90      |
| Loss    | 0.150  | 0.201  | 0.224  | 0.219  | 0.058  | 0.050  | 0.016  | 0.024  | 0.12    | 1.70        |
|         |        | Tangential |    |        | Radial |        |        | Cup    |         |             |
|         |        | —      |        |        | —      |        |        | —      |         |             |

Rotor Thickness (mm)

|         | Inner |       |       |       | Outer |       |       |       |         |             |
|---------|-------|-------|-------|-------|-------|-------|-------|-------|---------|-------------|
|         | 1     | 2     | 3     | 4     | 1     | 2     | 3     | 4     | Average | Mass (gram) |
| Initial | 9.066 | 9.066 | 9.068 | 9.068 | 9.066 | 9.069 | 9.067 | 9.069 | 9.067   | 3272.6      |
| Final   | 9.065 | 9.065 | 9.065 | 9.066 | 9.065 | 9.067 | 9.066 | 9.067 | 9.066   | 3272.4      |
| Loss    | 0.001 | 0.001 | 0.003 | 0.002 | 0.001 | 0.002 | 0.001 | 0.002 | 0.00    | 0.2         |

TABLE 6

WAX

Inboard Pad Thickness (mm)

|         | 1      | 2      | 3      | 4      | 5      | 6      | 7      | 8      | Average | Mass (gram) |
|---------|--------|--------|--------|--------|--------|--------|--------|--------|---------|-------------|
| Initial | 14.370 | 14.372 | 14.416 | 14.431 | 14.374 | 14.348 | 14.333 | 14.340 | 14.37   | 222.00      |
| Final   | 14.211 | 14.216 | 14.243 | 14.284 | 14.290 | 14.234 | 14.221 | 14.190 | 14.24   | 220.60      |
| Loss    | 0.159  | 0.156  | 0.173  | 0.147  | 0.084  | 0.114  | 0.112  | 0.150  | 0.14    | 1.40        |
|         |        | Tangential |    |        | Radial |        |        | Cup    |         |             |
|         |        | —      |        |        | —      |        |        | —      |         |             |

Outboard Pad Thickness (mm)

|         | 1      | 2      | 3      | 4      | 5      | 6      | 7      | 8      | Average | Mass (gram) |
|---------|--------|--------|--------|--------|--------|--------|--------|--------|---------|-------------|
| Initial | 14.362 | 14.344 | 14.326 | 14.323 | 14.313 | 14.334 | 14.389 | 14.342 | 14.34   | 218.0       |
| Final   | 14.178 | 14.165 | 14.136 | 14.105 | 14.199 | 14.263 | 14.342 | 14.299 | 14.21   | 217.30      |
| Loss    | 0.184  | 0.179  | 0.190  | 0.218  | 0.114  | 0.071  | 0.047  | 0.043  | 0.13    | 1.50        |
|         |        | Tangential |    |        | Radial |        |        | Cup    |         |             |
|         |        | —      |        |        | —      |        |        | —      |         |             |

Rotor Thickness (mm)

|         | Inner |       |       |       | Outer |       |       |       |         |             |
|---------|-------|-------|-------|-------|-------|-------|-------|-------|---------|-------------|
|         | 1     | 2     | 3     | 4     | 1     | 2     | 3     | 4     | Average | Mass (gram) |
| Initial | 9.064 | 9.067 | 9.067 | 9.063 | 9.065 | 9.067 | 9.067 | 9.069 | 9.066   | 3248.1      |
| Final   | 9.061 | 9.064 | 9.065 | 9.062 | 9.064 | 9.063 | 9.064 | 9.065 | 9.064   | 3247.7      |
| Loss    | 0.003 | 0.003 | 0.002 | 0.001 | 0.001 | 0.004 | 0.003 | 0.004 | 0.00    | 0.4         |

As it can be seen the wear of the brake pads manufactured with a friction material containing a hydrophobic wax is reduced in a significant manner, while the wear of the disc, even if higher, is not significant due to the considerable greater mass of the disc.

CONCLUSIONS

From the above working examples and disclosure it is clear that the mere addition of even a reduced amount of one of the hydrophobic waxes as disclosed herein in any possible friction material composition brings invariably to reduce or eliminate the tendency to stiction when compared with the same friction material composition but not containing a hydrophobic wax.

Friction materials containing hydrophobic additives different from a wax, like those according to WO 2019/171325, hereby incorporated by reference in its entirety, have generally a lower tendency to stiction, but not sufficient to render the risk of stiction sensibly lower, especially when the additive is used with friction materials showing (without any additive) a severe stiction in use.

Since the silica powder coated with siloxane is not chemically incompatible with any hydrophobic waxes the two additives (against creep groan and against stiction) may be employed together in the same friction material composition.

All the aims of the present disclosure are therefore fulfilled.

Certain Terminology

Although certain braking devices, systems, and methods have been disclosed in the context of certain example embodiments, it will be understood by those skilled in the art that the scope of this disclosure extends beyond the specifically disclosed embodiments to other alternative embodiments and/or uses of the embodiments and certain modifications and equivalents thereof. Use with any structure is expressly within the scope of this invention. Various features and aspects of the disclosed embodiments can be combined with or substituted for one another in order to form varying modes of the assembly. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations, one or more features from a claimed combination can, in some cases, be excised from the combination, and the combination may be claimed as any sub-combination or variation of any sub-combination.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Unless stated otherwise, the terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Some embodiments have been described in connection with the accompanying drawings. The figures are to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

SUMMARY

Various illustrative embodiments of braking devices, systems, and methods have been disclosed. Although the machines, systems, and methods have been disclosed in the context of those embodiments, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

The invention claimed is:

1. A friction block for a vehicle brake pad, the friction block comprising:
   an asbestos free friction material comprising:
      at least one of inorganic fibers, organic fibers, a binder, a friction modifier, a lubricant, a filler, or an abrasive; and
      a hydrophobic wax, wherein
         a relative quantity of the hydrophobic wax is selected based on a chemical nature and a quantity of remaining composing materials of the asbestos free friction material, such that the friction block has a hydrophobicity of more than 60 minutes of adsorption of a 20+/−5 µL liquid drop of distilled water within the friction block, and
      the hydrophobic wax is selected from a group consisting of: Polyethylene (PE) wax, High Density Polyethylene (HDPE) wax, Polypropylene wax, micronized PE wax, oxidized PE wax, Polytetrafluoroethylene (PTFE) modified polyethylene wax, Micronized Amide wax, Micronized Polypropylene wax, modified PE wax, and PTFE texture powder.

2. The friction block of claim 1, wherein the hydrophobic wax is in form of a solid powder having a melting point higher than 110° C.

3. The friction block of claim 1, wherein an amount of the hydrophobic wax in the asbestos free friction material is between 0.5% and 5% by volume.

4. The friction block of claim 3, wherein the amount of the hydrophobic wax in the asbestos free friction material is between 1% and 2% by volume.

5. The friction block of claim 1, wherein the friction block has a detachment force of less than 15 Newton from a first metal surface, when the friction block is electrochemically stitched against a second metal surface of steel, iron, or cast iron and thrust upon the first metal surface.

6. The friction block of claim 1, wherein the friction block is formed as a friction layer.

7. A vehicle brake pad, comprising:
   a base comprising iron, steel, or cast iron; and
   a friction material layer made of an asbestos free friction material comprising:
      at least one of inorganic fibers, organic fibers, a binder, a friction modifier, a lubricant, a filler, or an abrasive; and
      a hydrophobic wax, wherein a relative quantity of the hydrophobic wax is selected based on a chemical nature and a quantity of remaining composing materials of the asbestos free friction material, such that the friction block has a hydrophobicity of more than 60 minutes of adsorption of a 20+/−5 μL liquid drop of distilled water within the friction block, and the hydrophobic wax is selected from a group consisting of: Polyethylene (PE) wax, High Density Polyethylene (HDPE) wax, Polypropylene wax, micronized PE wax, oxidized PE wax, Polytetrafluoroethylene (PTFE) modified polyethylene wax, Micronized Amide wax, Micronized Polypropylene wax, modified PE wax, and PTFE texture powder.

8. The vehicle brake pad of claim 7, wherein the hydrophobic wax is in form of a solid powder having a melting point higher than 110° C.

9. The vehicle brake pad of claim 7, wherein an amount of the hydrophobic wax in the asbestos free friction material is between 0.5% and 5% by volume.

10. A method for manufacturing a vehicle brake pad, the method comprising:
  (1) preparing a first quantity of an asbestos free friction material by mixing together at least one of inorganic fibers, organic fibers, a binder, a friction modifier, a lubricant, a filler, or an abrasive;
  (2) selecting a hydrophobic wax from a group consisting of: Polyethylene (PE) wax, High Density Polyethylene (HDPE) wax, Polypropylene wax, micronized PE wax, oxidized PE wax, Polytetrafluoroethylene (PTFE) modified polyethylene wax, Micronized Amide wax, Micronized Polypropylene wax, modified PE wax, and PTFE texture powder;
  (3) adding a test quantity of the hydrophobic wax to the first quantity of the asbestos free friction material;
  (4) forming a solid block or layer of the asbestos free friction material with the hydrophobic wax by pressing and heating the asbestos free friction material mixed together in a mold to form the pad;
  (5) subjecting the pad to a hydrophobicity test by measuring the adsorption time of a 20+/−5 μL liquid drop of distilled water within the pad; and
  (6) repeating steps (3) through (5) until the adsorption time exceeds 60 minutes.

11. The method of claim 10, wherein adding the test quantity of hydrophobic wax to the first quantity of the asbestos free friction material comprises mixing the hydrophobic wax in form of a solid powder having a melting point higher than 110° C.

12. The method of claim 10, wherein, wherein a final amount of the hydrophobic wax in the asbestos free friction material is between 0.5% and 5% by volume.

13. The method of claim 10, wherein the pad has a detachment force of less than 15 Newton from a first metal surface, when the pad is electrochemically stitched against a second metal surface of steel, iron, or cast iron and thrust upon the first metal surface.

* * * * *